(12) United States Patent
Park

(10) Patent No.: US 11,821,405 B2
(45) Date of Patent: Nov. 21, 2023

(54) FLUID POWER GENERATOR AND POWER GENERATION SYSTEM COMPRISING SAME

(71) Applicant: Jun Kyu Park, Seoul (KR)

(72) Inventor: Jun Kyu Park, Seoul (KR)

( * ) Notice: Subject to any disclaimer, the term of this patent is extended or adjusted under 35 U.S.C. 154(b) by 136 days.

(21) Appl. No.: 17/434,133

(22) PCT Filed: Mar. 3, 2020

(86) PCT No.: PCT/KR2020/002991
§ 371 (c)(1),
(2) Date: Aug. 26, 2021

(87) PCT Pub. No.: WO2020/180083
PCT Pub. Date: Sep. 10, 2020

(65) Prior Publication Data
US 2022/0145852 A1 May 12, 2022

(30) Foreign Application Priority Data

Mar. 5, 2019  (KR) .......................... 10-2019-0024987
Jul. 22, 2019  (KR) .......................... 10-2019-0088171

(51) Int. Cl.
*F03D 3/06* (2006.01)
*F03D 3/00* (2006.01)
*F03D 3/04* (2006.01)

(52) U.S. Cl.
CPC .............. *F03D 3/061* (2013.01); *F03D 3/005* (2013.01); *F03D 3/0409* (2013.01); *F03D 3/062* (2013.01); *F05B 2240/301* (2013.01); *F05B 2240/372* (2020.08); *F05B 2250/15* (2013.01); *F05B 2250/291* (2013.01)

(58) Field of Classification Search
CPC ....... F03D 3/002; F03D 3/005; F05B 2250/15
See application file for complete search history.

(56) References Cited

U.S. PATENT DOCUMENTS

| | | | |
|---|---|---|---|
| 1,816,971 | A | 8/1931 | Hoff et al. |
| 3,941,504 | A | 3/1976 | Snarbach |
| 4,218,175 | A | 8/1980 | Carpenter |
| 9,004,851 | B1 | 4/2015 | Garza |
| 2007/0029807 | A1 | 2/2007 | Kass |
| 2013/0106193 | A1 | 5/2013 | Bryson |
| 2015/0078897 | A1 | 3/2015 | Min |

(Continued)

FOREIGN PATENT DOCUMENTS

| | | |
|---|---|---|
| CN | 201474868 U | 5/2010 |
| CN | 104271945 A | 1/2015 |
| FR | 827487 A | 4/1938 |

(Continued)

*Primary Examiner* — Christopher R Legendre
(74) *Attorney, Agent, or Firm* — Bridgeway IP Law Group, PLLC; Jihun Kim

(57) ABSTRACT

A fluid power generator can enhance power generation efficiency by efficiently using the drag force of wind without increasing the size of blades, and includes: an ascending air current-forming body provided at a rotary shaft; a plurality of spiral blades which are spirally formed along the outer circumferential surface of the ascending air current-forming body; and a generator which generates electricity by rotation of the ascending air current-forming body.

10 Claims, 16 Drawing Sheets

(56) References Cited

U.S. PATENT DOCUMENTS

2016/0032889 A1\* 2/2016 Tan .......................... F03D 9/11
    416/61
2022/0145852 A1\* 5/2022 Park .......................... F03D 3/02

FOREIGN PATENT DOCUMENTS

| JP | 2012-057483 A | 3/2012 |
|----|---------------|--------|
| KR | 10-2010-0007002 A | 1/2010 |
| KR | 10-2011-0004113 A | 1/2011 |
| KR | 10-2011-0058110 A | 6/2011 |
| KR | 10-1156642 B1 | 6/2012 |
| KR | 10-2014-0052445 A | 5/2014 |
| KR | 10-2016-0139286 A | 12/2016 |
| WO | 2011/037870 A2 | 3/2011 |
| WO | 2012/046969 A2 | 4/2012 |

\* cited by examiner

FLUID POWER GENERATOR AND POWER GENERATION SYSTEM COMPRISING SAME

TECHNICAL FIELD

The disclosure relates to a fluid power generator, and more particularly to a fluid power generator, which can efficiently produce electricity even in a weak wind, and a power generation system including the same.

BACKGROUND ART

In general, wind power generation refers to a power generation method of turning a windmill with a wind of nature, and transmitting accelerating force of the turning windmill to a generator through gears and the like mechanical transmission.

In this case, only 59.3% of wind energy is theoretically convertible into electric energy by a blade, but only 20~40% has actually been used as electric energy when efficiency and mechanical friction according to the shape of the blade, a generator efficiency, etc. are taken into account.

However, with recent rapid increase in the spread of wind power generators over European countries, electricity produced by the wind power generators has been expected to reach 10% of all the European countries' electricity by 2020.

Further, according to data analyzed so far, a power generation system using the wind energy is decreased in unit cost of power generation based on establishment of technology, and thus competes in unit cost of electricity production against that using fossil fuel. Furthermore, the power generation system is expected to be rapidly and widely spread all over the world because produced energy is eco-friendly and pollution-free energy.

The wind power generator is classified into a lift type and a drag type according to the shapes of the windmill blade. In Korea, there are few areas having local environmental conditions under which a strong wind consistently blows long hours, and it is thus efficient to use the drag-type wind power generator because the drag-type wind power generator is suitable for turning the windmill with low wind pressure.

Such a drag-type wind power generator has advantages that it is possible to increase the amount of force received from a wind by increasing the height of the blade, i.e., the length of the blade in an axial direction of a pillar, but has disadvantages that there are unavoidable limitations to materially and structurally decreasing the weight of the blade on the contrary to increasing the size of the blade because the larger the blade the heavier it is and the weight of frames for solidly supporting the blade is also increased in addition to the weight of the blade.

DISCLOSURE

Technical Problem

Accordingly, the disclosure is conceived to solve the foregoing problems, and an aspect of the disclosure is to provide a fluid power generator and a power generation system including the same, in which drag of wind is efficiently used to improve efficiency of power generation without increasing the size of a blade.

Technical Solution

According to an aspect of the disclosure, there is provided a fluid power generator including: an ascending air-current forming body installed in a rotary shaft; a plurality of spiral blades spirally formed along an outer circumferential surface of the ascending air-current forming body; and a generator configured to produce electricity based on rotation of the ascending air-current forming body.

The ascending air-current forming body may include a lower outer diameter larger than the upper outer diameter.

The spiral blade may include a horizontal width gradually increasing upward from a bottom.

The fluid power generator may further include a first auxiliary drag blade formed inclined against a surface of the spiral blade along an edge of the spiral blade and receiving drag while trapping wind.

The first auxiliary drag blade may include a horizontal width gradually increasing upward from a bottom.

Further, the fluid power generator may further include a second auxiliary drag blade formed at an upper end portion of the spiral blade.

The second auxiliary drag blade may be formed as curved in a direction of receiving drag of an ascending air-current.

Further, the fluid power generator may further include a wind-guiding reinforcing blade formed in an upper portion of the spiral blade.

The wind-guiding reinforcing blade may include an upper exposure surface connected along an edge of the second auxiliary drag blade to provide a wind outlet between the wind-guiding reinforcing blade and the second auxiliary drag blade and exposed to an outside.

Here, the upper exposure surface may include a sign.

The fluid power generator may further include an upper-end cap formed in an upper end portion of the ascending air-current forming body.

Further, at least one of the ascending air-current forming body and the spiral blade may be structured to internally have a hollow.

Here, the fluid power generator may further include an inlet formed to inject and discharge a fluid in and from the hollow.

The fluid power generator may further include a binding unit formed to maintain a contracted state in which the fluid is discharged from the hollow.

The hollows of the spiral blade and the ascending air-current forming body may be formed to communicate with each other.

Further, the hollow may be filled with a solid.

According to an aspect of the disclosure, there is provided a power generation system with a fluid power generator including: the foregoing fluid power generator; and an up-and-down movement actuator installed to apply an activation force to move up and down the fluid power generator, the rotary shaft including a long up-and-down movement rod formed to cross a center of the ascending air-current forming body to function as a moving rail for the fluid power generator.

The power generation system may include a windbreak formed to surround the spiral blade and prevent a wind force from being applied to the spiral blade in a state that the fluid power generator is moved down.

The windbreak may include a plant cultivation container including a space for cultivating a plant.

According to an aspect of the disclosure, there is provided a power generation system with a fluid power generator, including: the plurality of fluid power generators, the plurality of fluid power generators being arranged at multi levels along up and down directions, and the rotary shaft is formed long to cross a center of the ascending air-current forming body of the fluid power generator.

The power generation system may further include: a support frame installed along an arranged direction of the fluid power generator; and a plurality of shaft supporting members installed between the support frame and the rotary shaft to rotatably support the rotary shaft.

According to an aspect of the disclosure, there is provided A power generation system with a fluid power generator, including: the plurality of fluid power generators, the power generation system including a rotary frame in which the plurality of fluid power generators is rotatably installed.

The rotary frame may include: a main rotary shaft connected to the generator; and a plurality of rotary supporting members including a first end rotatably connected to the main rotary shaft and a second end connected to the rotary shaft.

The rotary supporting member may include a lower rotary supporting member including a first end connected to the main rotary shaft and a second end connected to a lower end of the rotary shaft, and an upper rotary supporting member including a first end connected to the main rotary shaft and a second end connected to the rotary shaft.

The rotary supporting members may be arranged to form a plurality of layers along upper and lower directions of the main rotary shaft.

Advantageous Effects

As described above, according to the disclosure, the rotating torque is generated by the drag of the spiral blade, and a wind is not wholly and straightly pass through the ascending air-current forming body but a certain amount of wind forms the ascending air-current while flowing toward an upper side having a small diameter, thereby having effects on increasing the rotating torque with the additionally received drag of the ascending air-current and improving power generation efficiency.

Further, according to the disclosure, the ascending air-current formed by the ascending air-current forming body causes the rotating torque to be additionally generated in the first auxiliary drag blade and the second auxiliary drag blade, thereby remarkably improving power generation efficiency of electric energy. Furthermore, the wind-guiding reinforcing blade connects and reinforces the second auxiliary drag blades with each other, and a sign is formed on the upper exposure surface exposed to the outside, thereby achieving the fluid power generator for advertisement to have an advertisement effect.

In the power generation system with the fluid power generator according to the disclosure, the plurality of fluid power generators are provided at multi levels, thereby having an effect on obtaining high-output electric energy based on the rotating torques generated in the fluid power generators.

DESCRIPTION OF DRAWINGS

FIGS. 8A to 8C are views for describing a power generation system with the fluid power generator according to the first embodiment of the disclosure, in which FIG. 8A shows a state that a rotating body portion of the fluid power generator is moved up; FIG. 8B shows a state that the rotating body portion of the fluid power generator is moved down; and FIG. 8C is a partially-enlarged exploded perspective view for describing an up-and-down movement actuator.

MODE FOR INVENTION

Below, embodiments of the disclosure will be described in detail with reference to the accompanying drawings of FIGS. 1 to 11C, and like numerals refer to like elements throughout FIGS. 1 to 11C. In the accompanying drawings, illustrations and detailed descriptions about structures and their functions and effects, which are easily understood by those skilled in the art from general technology, are simplified or omitted, and the illustrations are made focusing on parts related to the disclosure.

Figure 1:
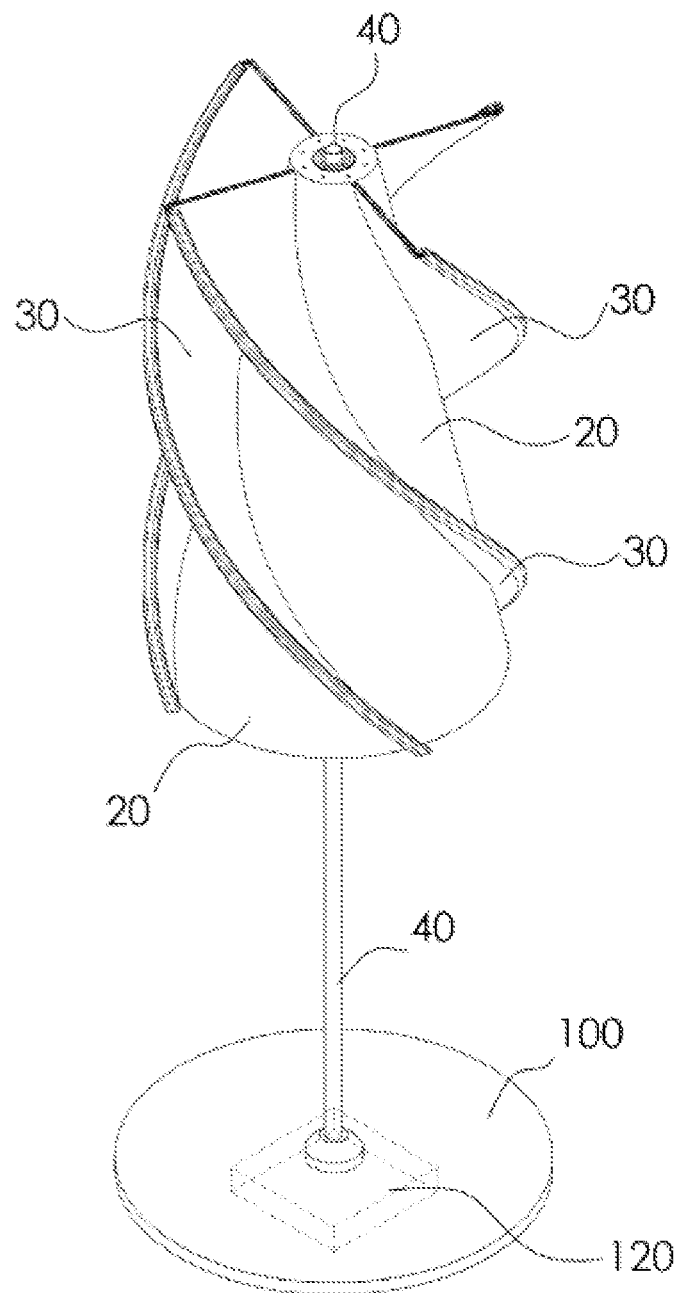
FIG. 1 is a perspective view of a fluid power generator according to a first embodiment of the disclosure.
Figure 2:
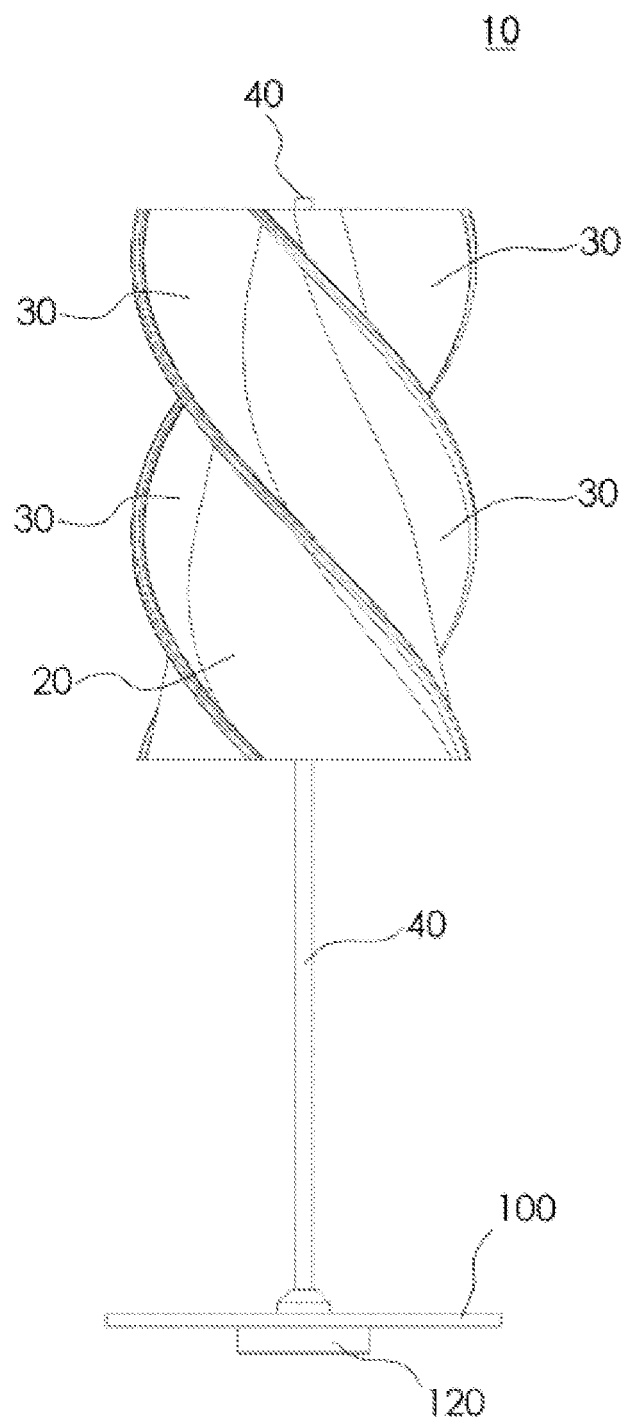
FIG. 2 is a front view of the fluid power generator shown in FIG. 1.

FIG. 1 is a perspective view of a fluid power generator according to a first embodiment of the disclosure, and FIG. 2 is a front view of the fluid power generator shown in FIG. 1.

Referring to FIGS. 1 and 2, the fluid power generator 10 according to the first embodiment of the disclosure is to efficiently use low drag of wind in efficiently generating power without increasing the size of blades, and includes an ascending air-current forming body 20, a rotary shaft 40, a spiral blade 30, and a generator 120.

Inside the fluid power generator 10, a reinforcing support (not shown) may be added to reinforce the fluid power generator 10.

The ascending air-current forming body 20 is installed in the rotary shaft 40 as an element for serving as a main body in which the spiral blades 30 are installed.

Further, it is characterized in that the ascending air-current forming body 20 is structured to improve a power generation efficiency by allowing a wind not to wholly and straightly pass therethrough but to form an ascending air-current based on interaction with the spiral blades 30.

To this end, the ascending air-current forming body 20 is approximately shaped like a cone, of which a lower outer diameter is larger than an upper outer diameter.

The rotary shaft 40 refers to an element installed in the ascending air-current forming body 20, and functions to transmit a rotating force of the ascending air-current forming body to the generator. Here, the rotary shaft 40 is installed as inserted in a shaft insertion hole formed at the center of the ascending air-current forming body, but its installation structure is not limited to this structure but may have various structures.

The spiral blade 30 is spirally formed upward from the bottom along the outer circumferential surface of the ascending air-current forming body 20, and a plurality of spiral blades 30 are equiangularly arranged as shown in FIG. 1.

In particular, the horizontal width of the spiral blade 30 is gradually increased upward from the bottom so as to receive drag from the ascending air-current. Here, the horizontal width refers to a distance from a part of the spiral blade 30 connected to the ascending air-current forming body 20 to an outer edge of the spiral blade 30.

Further, the increase in the horizontal width of the spiral blade 30 corresponds to the decrease in the outer diameter of the ascending air-current forming body 20 tapering upward, so that the lower spiral blade 30 can have approximately the same size as the upper outer diameter.

The generator 120 refers to an element for producing electricity based on a rotating force received from the rotary shaft, and various generators used in the field of the wind power generation may be selected and employed as the generator 120 without limitations. However, the generator 120 to be installed may have a compact structure with rated capacity adapted for the rotating torque of the rotary shaft 40.

For example, when the drag of the spiral blade 30 is transferred to the ascending air-current forming body 20 and the rotary shaft 40 is thus rotated, a motor shaft connecting with the rotary shaft 40 spins and a built-in power generation coil or permanent magnet rotates, thereby making the generator 120 induce an electric current in the coil based on a magnetic field of the magnet. In the accompanying drawings, the generator is illustrated as a conceptual block without showing its concrete shape.

The operations of the foregoing fluid power generator according to the first embodiment of the disclosure will be schematically described.

When wind blows in a state that the rotary shaft 40 shown in FIGS. 1 and 2 is connected to the motor shaft of the generator installed on a supporting plate 100, drag on the spiral blades 30 causes rotation like a general wind-power generation rotating body, thereby producing electric energy based on power generation of the generator 120 connected to the rotary shaft 40.

In particular, the fluid power generator according to the first embodiment of the disclosure includes the ascending air-current forming body 20 having a conical shape, of which the lower outer diameter is larger than the upper outer diameter, and therefore a wind colliding with or going via the ascending air-current forming body 20 does not wholly and straightly pass through the ascending air-current forming body 20 but a certain amount of wind forms the ascending air-current flowing toward an upper side having a small diameter.

Such an ascending air-current applies the drag on the spiral blades 30 to thereby generate the rotating force. In this case, the spiral blades 30 have a spirally winding structure with the horizontal widths gradually increasing upward from the bottom, and thus trap the wind to some extent so that the rotating torque can be increased based on additional drag caused by the ascending air-current while maintaining the ascending air-current, thereby having an advantage of improving a power generation efficiency.

Below, other embodiments according to the disclosure will be described, in which detailed descriptions about elements similar to those shown in the foregoing first embodiment and its alternative examples are omitted and descriptions will be made focusing on different elements. Further, if some elements shown in the foregoing first embodiment and its alternative examples are compatible with elements to be shown in the following embodiments, the elements may be selectively employed in the following embodiments, but detailed descriptions or illustrations thereof are omitted.

Figure 3:
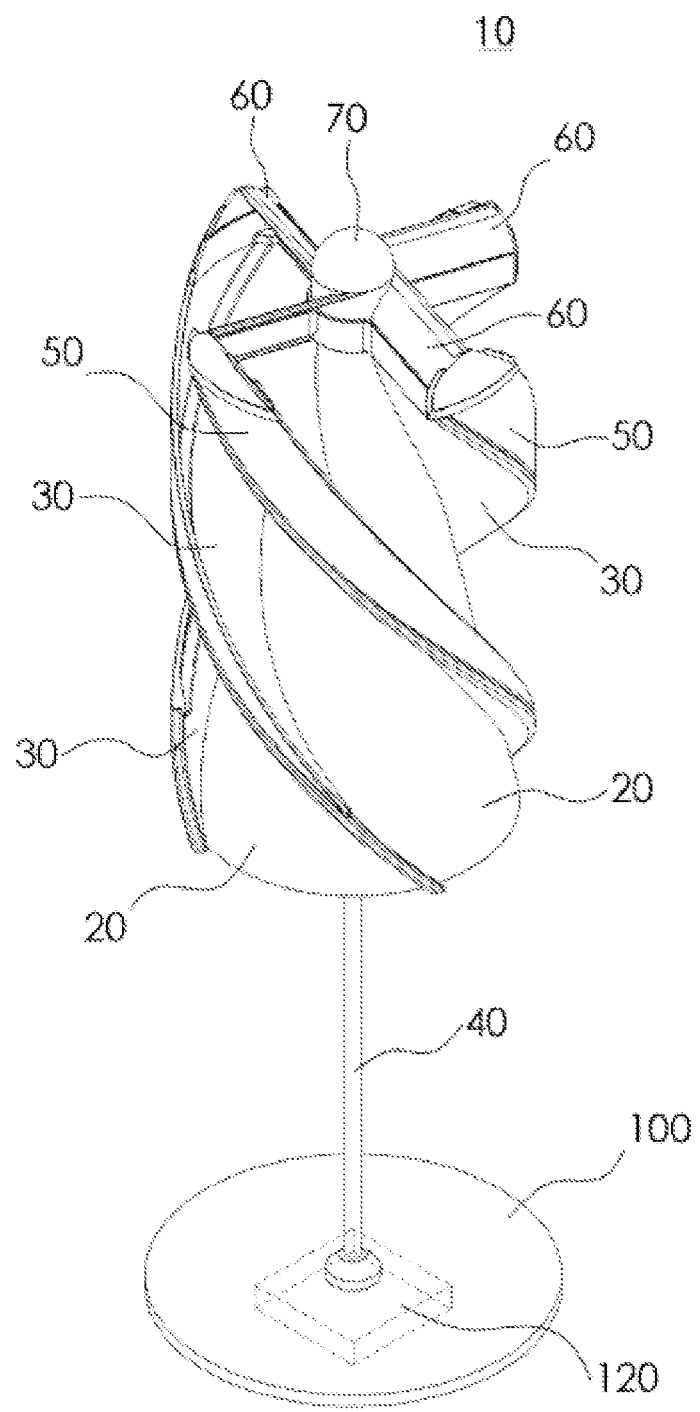
FIG. 3 is a perspective view of a fluid power generator according to a second embodiment of the disclosure.

FIG. 3 is a perspective view of a fluid power generator according to a second embodiment of the disclosure.

Referring to FIG. 3, the fluid power generator 10 according to the second embodiment of the disclosure includes the ascending air-current forming body 20, the rotary shaft 40, the spiral blade 30 and the generator 120, and further includes a first auxiliary drag blade 50 to increase the rotating torque.

The first auxiliary drag blade 50 is formed as extended to protrude along an external end, i.e., an edge of the spiral blade 30, and formed as inclined against the surface of the spiral blade 30, thereby receiving drag while trapping the wind.

In particular, the first auxiliary drag blade 50 is formed with the horizontal width gradually increasing upward from the bottom so as to effectively trap the wind. Here, the horizontal width refers to a distance from a part of first auxiliary drag blade 50 connected to the spiral blade 30 to an outer edge of the first auxiliary drag blade 50.

Further, the first auxiliary drag blade 50 may be formed integrally with the spiral blade 30, or may be separately manufactured and then coupled to the spiral blade 30 by welding or adhesive.

Meanwhile, the fluid power generator 10 according to the second embodiment of the disclosure may further include a second auxiliary drag blade 60 to generate the rotating torque based on the drag of the ascending air-current flowing out through a valley between the ascending air-current forming body 20 and the spiral blade 30 and the first auxiliary drag blade 50.

The second auxiliary drag blade 60 is formed on the upper end portion of the spiral blade, and curved in a direction to receive drag based on the ascending air-current.

For example, the second auxiliary drag blade 60 is connected between the upper end portion of the spiral blade 30 and the upper end portion of the ascending air-current forming body 20, and is curved to have an approximately arc-shaped cross-section.

Further, the upper end portion of the ascending air-current forming body 20 is additionally mounted with a hemispherical upper-end cap 70.

Operations of the foregoing fluid power generator according to the second embodiment of the disclosure will be schematically described.

The fluid power generator according to the second embodiment of the disclosure includes the first auxiliary drag blade 50 and the second auxiliary drag blade 60 to additionally generate the rotating torque based on the drag in addition to the power generation described in the operations of the first embodiment, thereby further improving the power generation efficiency.

In more detail, the first auxiliary drag blade 50 is formed at the external end of the spiral blade 30, and thus receives the drag while trapping the ascending air-current having a tendency to flow outward in a centrifugal direction, thereby increasing the rotating torque and improving the power generation efficiency.

Further, the second auxiliary drag blade 60 is curved at the upper end portion of the spiral blade 30 in a direction of receiving drag based on an ascending air-current, and thus receives the drag of the ascending air-current flowing out through the valley between the first auxiliary drag blade 50 and the ascending air-current forming body 20, thereby increasing the rotating torque and having an advantage of additionally improving the power generation efficiency.

As described above, the additional rotating torque is primarily and secondarily generated by the first auxiliary drag blade 50 and the second auxiliary drag blade 60, thereby having an advantage of relatively increasing power generation of electric energy even though a given wind force is used.

Figure 4:
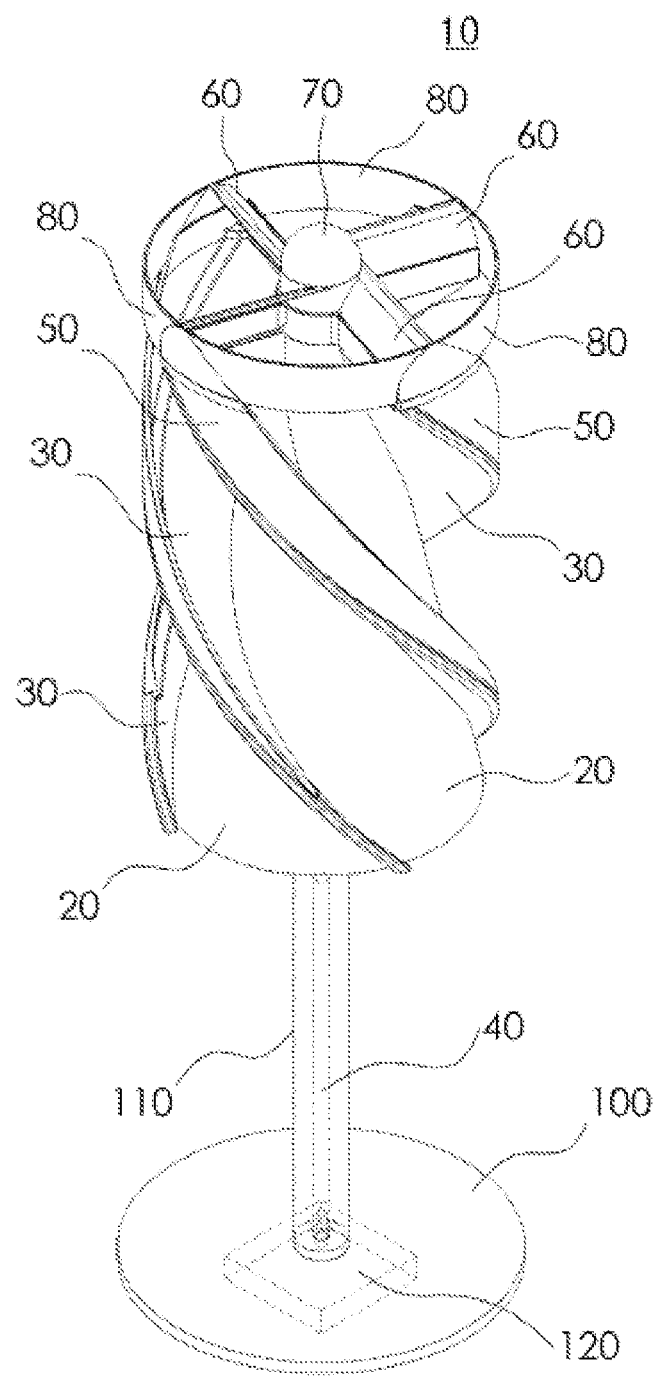
FIG. 4 is a perspective view of a fluid power generator according to a third embodiment of the disclosure.
Figure 5:
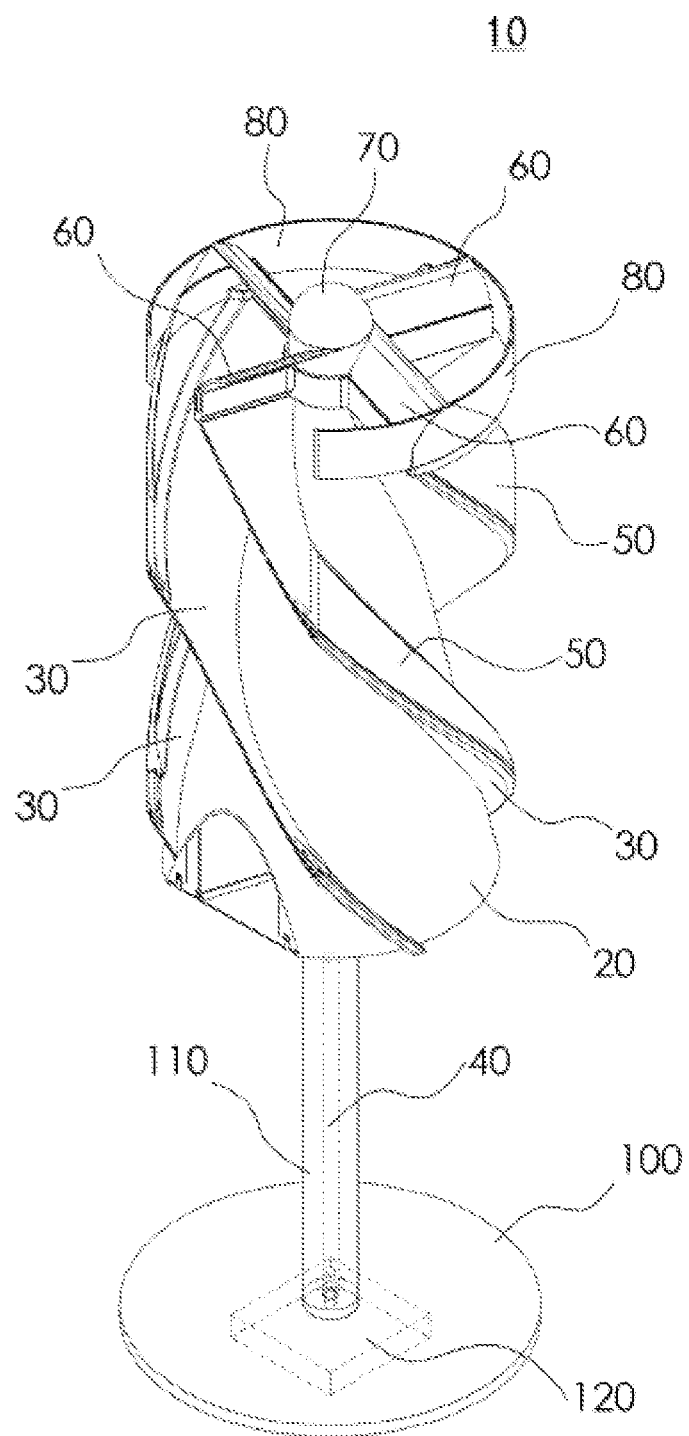
FIG. 5 is a partial cut-open perspective view of the fluid power generator according to the third embodiment of the disclosure.

FIG. 4 is a perspective view of a fluid power generator according to a third embodiment of the disclosure, and FIG. 5 is a partial cut-open perspective view of the fluid power generator according to the third embodiment of the disclosure.

Referring to FIGS. 4 and 5, the fluid power generator 10 according to the third embodiment of the disclosure includes the ascending air-current forming body 20, the rotary shaft 40, the spiral blade 30 and the generator 120, the first auxiliary drag blade 50, the second auxiliary drag blade 60, and further includes a wind-guiding reinforcing blade 80 formed to surround the upper end of the spiral blade 30.

For example, the wind-guiding reinforcing blade 80 is formed as connected to the second auxiliary drag blade 60, and provided along the edge of the second auxiliary drag blade 60 to form a wind outlet between the second auxiliary drag blade 60 and the wind-guiding reinforcing blade 80. Here, the wind outlet functions as a passage through which the ascending air-current is exhausted after applying the drag to the second auxiliary drag blade 60.

Further, there are no specific limits to the shape and structure of the wind-guiding reinforcing blade 80 as long as it can form the wind outlet. In this embodiment, the wind-guiding reinforcing blade 80 is made of a plate-like member and has a ring-shaped structure, thereby externally forming an upper exposure surface to be used as a sign for advertisement.

The upper exposure surface is exposed to the outside, and thus serves as a sign on which a text or a design is printed, or a sign in which an electronic sign is formed using a light emitting diode (LED) module.

As described above, the wind-guiding reinforcing blade 80 forms the wind outlet, so that the ascending air-current flowing upward through the valley between the first auxiliary drag blade 50 and the ascending air-current forming body 20 can function to trap wind in order to apply a wind force to the second auxiliary drag blade 60, thereby guiding the wind to be stably discharged while increasing the rotating torque, and having an effect on reducing generation of a whirl.

Further, the wind-guiding reinforcing blade 80 functions to connect and reinforce the second auxiliary drag blades 60, and forms the sign on its upper exposure surface to be exposed to the outside, thereby achieving the fluid power generator for advertisement to have an advertisement effect.

Meanwhile, the fluid power generator 10 according to the third embodiment of the disclosure includes a pillar pipe 110 having a cylindrical shape and installed on the outside of the rotary shaft 40.

The pillar pipe 110 prevents the rotary shaft 20 from contact with an external object or a human body when the rotary shaft 20 spins, thereby preventing a safety accident.

Figure 6:
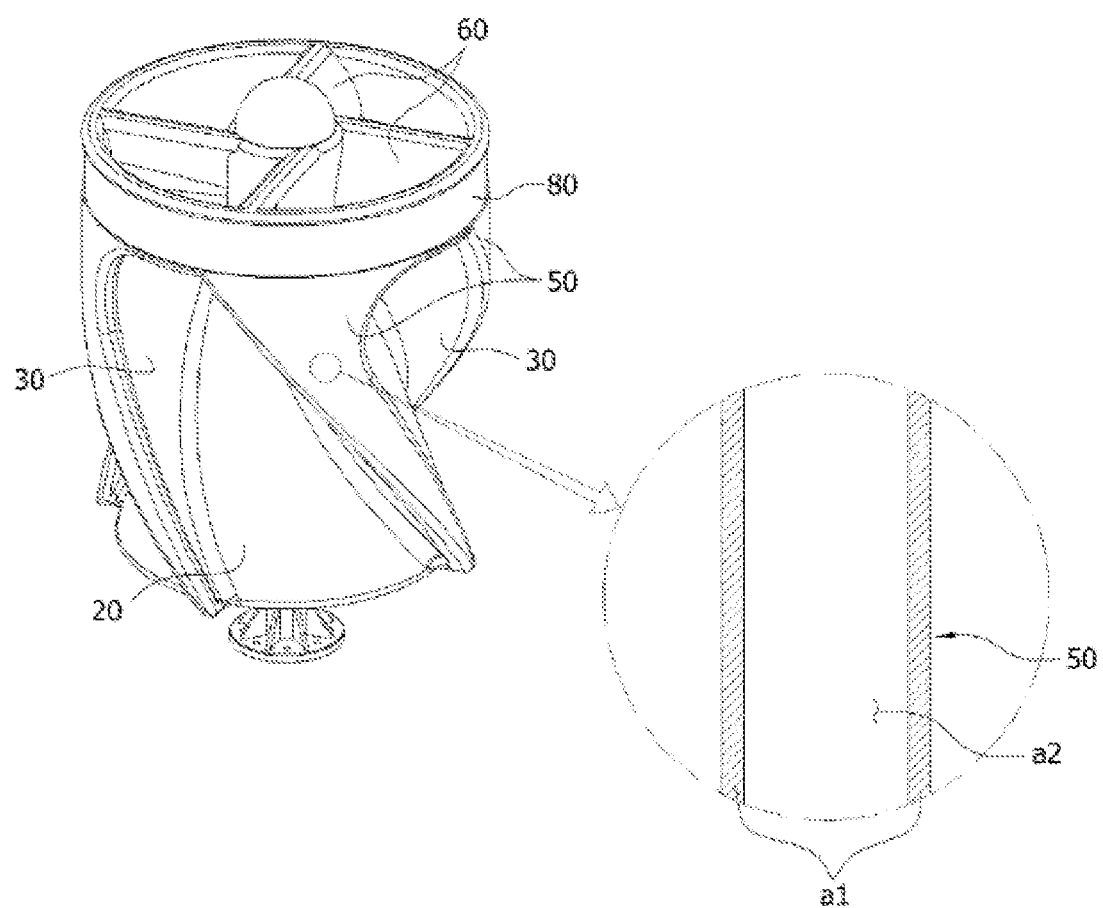
FIG. 6 is a perspective view of a fluid power generator according to a fourth embodiment of the disclosure.

FIG. 6 is a perspective view of a fluid power generator according to a fourth embodiment of the disclosure, in which the enlarged view shows a cross-section of an indicated portion.

Referring to FIG. 6, the fluid power generator 10 according to the fourth embodiment of the disclosure includes the ascending air-current forming body 20, the rotary shaft 40, the spiral blade 30 and the generator 120, the first auxiliary drag blade 50, the second auxiliary drag blade 60, and the wind-guiding reinforcing blade 80, in which the ascending air-current forming body 20 and the blades have a hollow structure.

For example, the ascending air-current forming body 20, the spiral blade 30, the first auxiliary drag blade 50, the second auxiliary drag blade 60, and the wind-guiding reinforcing blade 80 are internally formed with a hollow a2 between a pair of surficial bodies a1. Here, air or the like fluid may be injected into the hollow a2.

In this case, the surficial body a1 is made of synthetic resin or airtight fabric having airtightness and certain rigidity, and provided to contract and expand as necessary.

Further, the surficial body a1 may be made of cloth which has certain rigidity and through which fluid can pass.

The surficial body a1 may be formed with an inlet (not shown) through which fluid is injected into or discharged from the hollow a2. Here, the inlet may be embodied as an air injection value typically provided in an air mat or the like air injection structure.

Further, although it is not illustrated, the hollows of the ascending air-current forming body 20, the spiral blade 30, the first auxiliary drag blade 50, the second auxiliary drag blade 60, and the wind-guiding reinforcing blade 80 may communicate with one another so that air can be injected and discharged through a single inlet.

Further, a binding unit (not shown) may be provided to bind the ascending air-current forming body 20, the spiral blade 30, the first auxiliary drag blade 50, the second auxiliary drag blade 60, and the wind-guiding reinforcing blade 80 and maintain a contracted state in which air is discharged.

The binding unit may include a rope (not shown), and a binding ring (not shown) installed at the edge portions of the ascending air-current forming body 20 and the blades 30, 50, 60 and 70 and binding the ascending air-current forming body 20 and the blades 30, 50, 60 and 70 as the rope is inserted therein.

In this way, the binding unit (not shown) binds the ascending air-current forming body 20 and the blades 30, 50, 60 and 70 together in the contracted state to minimize the volume, thereby carrying or handling the fluid power generator with ease, and protecting the fluid power generator when typhoon or the like wind of a high-speed blows.

For example, when typhoon or the like wind of a high-speed blows, the ascending air-current forming body 20 and the blades 30, 50, 60 and 70 are deflated and then the binding rings are threaded with the rope to bind them together, thereby preventing the blades from damage or breakage due to the typhoon.

Meanwhile, the fluid power generator according to the fourth embodiment of the disclosure has a structure that all the ascending air-current forming body 20, the spiral blade 30, the first auxiliary drag blade 50, the second auxiliary drag blade 60, and the wind-guiding reinforcing blade 80 have the hollow by way of example. Alternatively, only a specific blade may be partially formed with a hollow.

As described above, the fluid power generator 10 according to the fourth embodiment of the disclosure is improved in convenience when handed, such as, installed, carried, etc. because its elements are contracted and expanded as necessary, and is improved in safety and durability because it is easily folded and stored to prevent damage or breakage under a typhoon or the like emergency situations.

Figure 7:
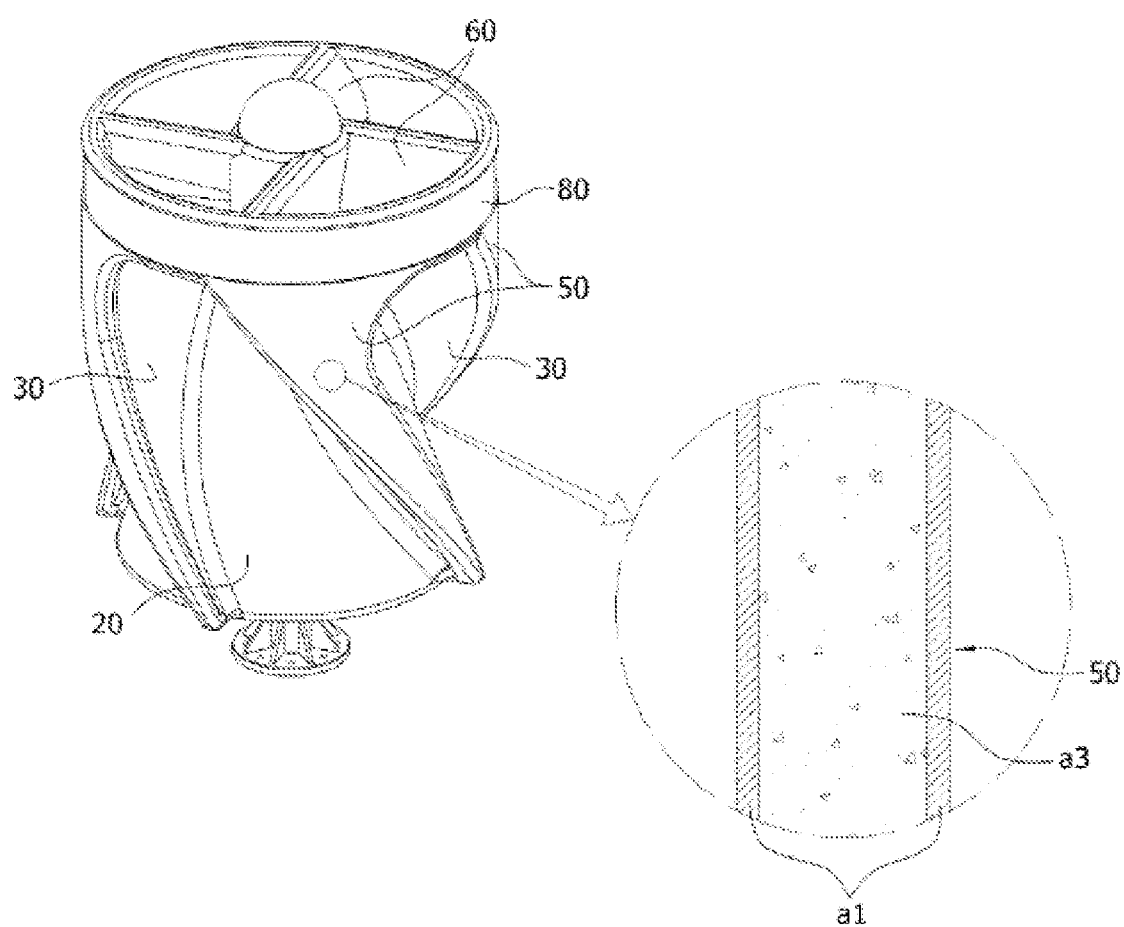
FIG. 7 is a perspective view for describing an alternative example of the fluid power generator according to the fourth embodiment of the disclosure.

FIG. 7 is a perspective view for describing an alternative example of the fluid power generator according to the fourth embodiment of the disclosure, in which in which the enlarged view shows a cross-section of an indicated portion.

Referring to FIG. 7, in the fluid power generator 10 according to the fourth embodiment of the disclosure, the ascending air-current forming body 20 and the blades 30, 50, 60 and 70 are structured to have a hollow between a pair of surficial bodies a1, and the hollow is filled with a solid a3.

The solid a3 may include various materials without any specific limitations as long as it can have certain rigidity. In this embodiment, the hollow is filled with a foaming material.

The ascending air-current forming body 20 and the blades 30, 50, 60 and 70 are structured to have the hollow filled with a relatively inexpensive and lightweight foaming material, thereby having advantages of reducing installation costs because it is lightweight and carried, installed and handled with ease, and remarkably reducing costs of manufacturing and constructing the fluid power generator because its material costs are low and a manufacturing process is simplified.

Meanwhile, the hollows of the ascending air-current forming body 20 and the blades 30, 50, 60 and 70 may be fully filled with the solid a3. However, alternatively, only a specific blade may be filled with the solid, and the other elements may be filled with air.

Figure 8A:
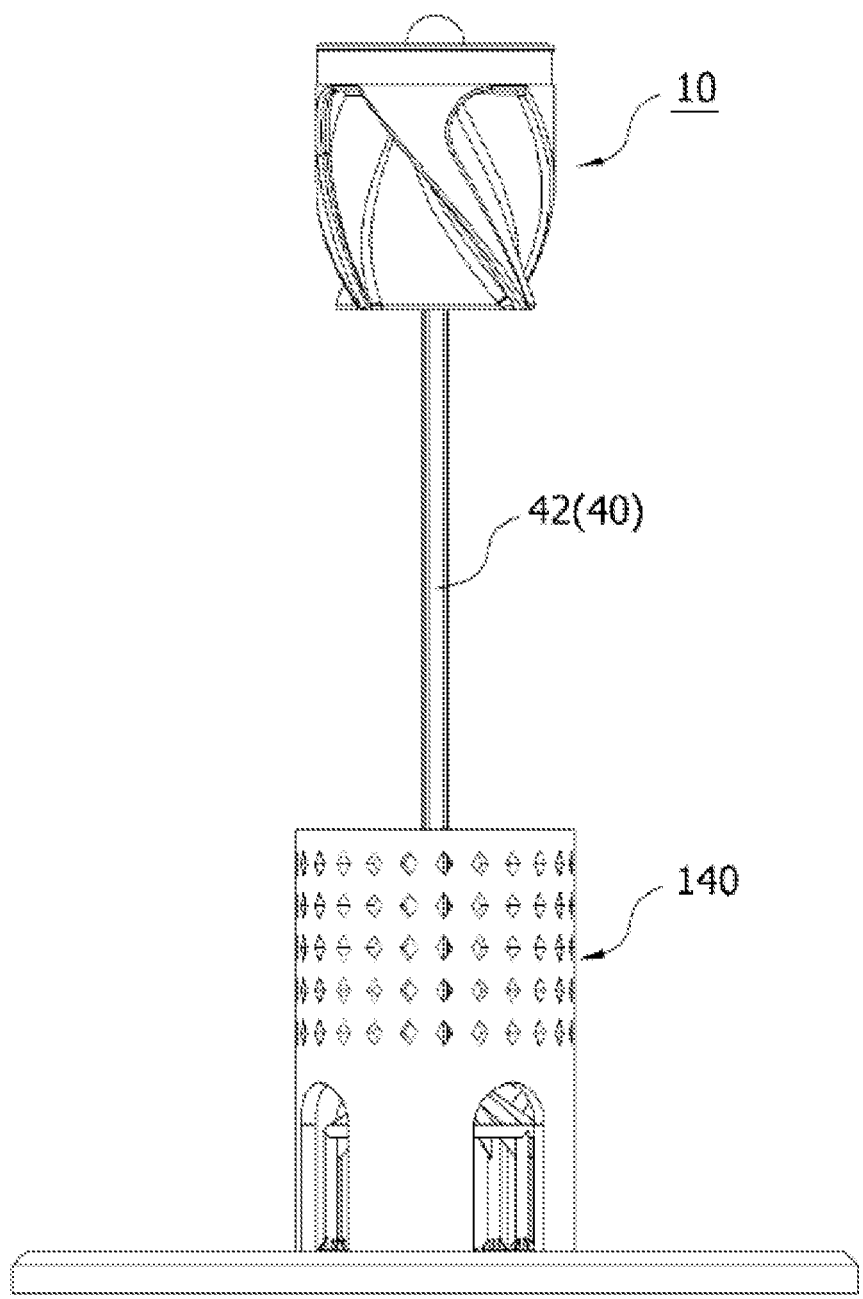
Figure 8B:
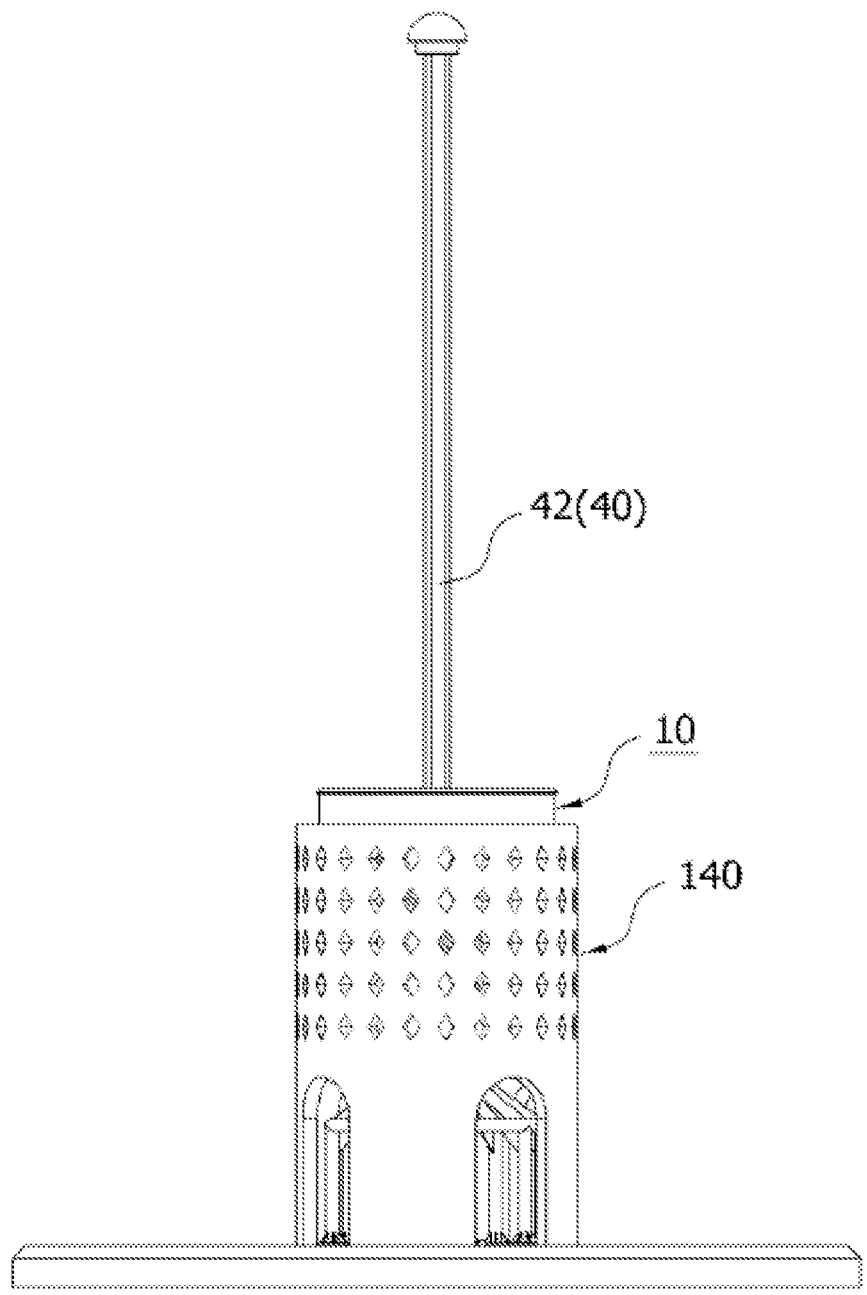
Figure 8C:
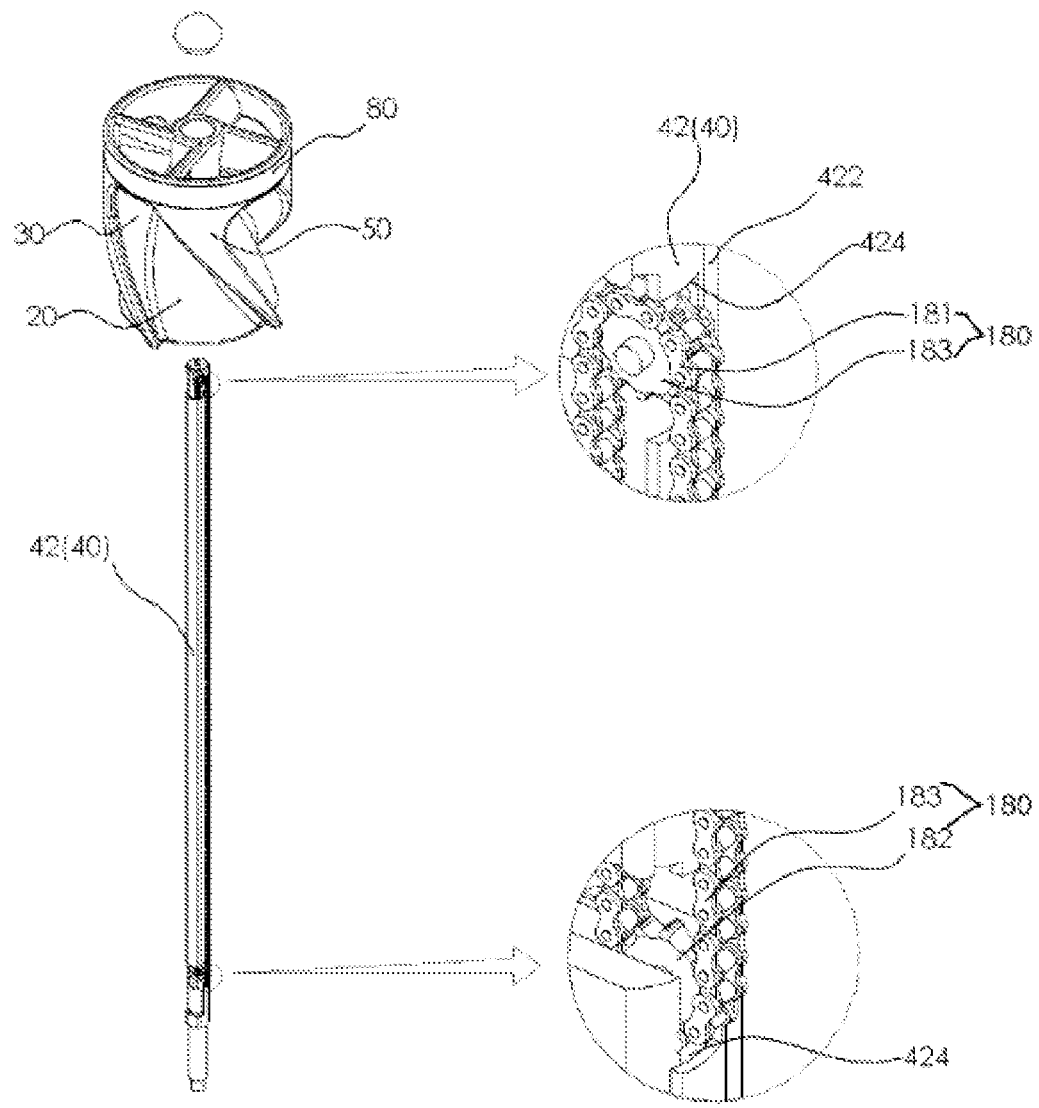

FIGS. 8A to 8C are views for describing a power generation system with the fluid power generator according to the first embodiment of the disclosure, in which FIG. 8A shows a state that a rotating body portion of the fluid power generator is moved up; FIG. 8B shows a state that the rotating body portion of the fluid power generator is moved down; and FIG. 8C is a partially-enlarged exploded perspective view for describing an up-and-down movement actuator.

Referring to FIGS. 8A to 8C, the power generation system with the fluid power generator according to the first embodiment includes the fluid power generator 10 selected among the foregoing fluid power generators disclosed in the foregoing embodiments, and an up-and-down movement actuator 180 applying an actuation force to the fluid power generator 10 to move up and down.

The rotary shaft 40 provided in the fluid power generator includes a long up-and-down movement rod 42 installed to penetrate the center of the ascending air-current forming body 20 so as to function as a moving rail for the fluid power generator.

Further, the up-and-down movement rod 42 is, as shown in FIG. 8C, formed with a plurality of stopper lines 422 that functions as a key along a lengthwise direction in a body shaped like a round bar so as to spin interlocking with rotation of the ascending air-current forming body 20 while allowing the ascending air-current forming body 20 to move up and down. Further, the up-and-down movement rod may be formed as an angular bar having a polygonal cross-section besides the shape shown in FIG. 8C.

Further, the ascending air-current forming body 20 is internally formed with a movement hole (not shown) at the center thereof, and the shape of the movement hole corresponds to the cross-section of the up-and-down movement rod 42. In this case, the movement hole has an inner diameter, which is a little larger than the outer diameter of the up-and-down movement rod 42, thereby forming a gap for allowing the ascending air-current forming body 20 put on the up-and-down movement rod 42 to move up and down.

The up-and-down movement actuator 180 refers to an element for moving the part (hereinafter, referred to as a 'rotating body') of the fluid power generator up and down except the rotary shaft 40, and any device or structure may be selected for the up-and-down movement actuator 180 without specific limitations as long as it can move up and down the fluid power generator.

For example, the up-and-down movement actuator 180 includes an upper actuation sprocket 181 and a lower actuation sprocket 182 installed at an upper side and a lower side of an actuator installation groove 424 internally formed in the rotary shaft 40 and lengthwise recessed, an actuation chain 183 connected to the upper actuation sprocket 181 and the lower actuation sprocket 182, and an actuation motor (not shown) connected to the lower actuation sprocket 182 and applying a rotating force.

Here, a specific portion of the actuation chain 183 is inserted and held in a chain installation groove (not shown) formed in the ascending air-current forming body 20 of the fluid power generator, and the actuation chain 183 moves up and down based on rotation of the actuation motor, thereby moving the fluid power generator up and down.

Further, the up-and-down movement actuator 180 may employ a belt actuation method as well as the foregoing chain actuation method. For example, the up-and-down movement actuator 180 may include an upper actuation pulley (not shown) and a lower actuation pulley (not shown) installed at the upper and lower sides of the actuator installation groove 424, an actuation belt (not shown) connected to the upper and lower actuation pulleys, and an actuation motor (not shown) connected to the lower actuation pulley and applying a rotating force.

Meanwhile, the power generation system with the fluid power generator according to the first embodiment includes a windbreak 140 to prevent a wind force from being applied to the spiral blade 30 in the state that the rotating body of the fluid power generator 10 is moved down.

The windbreak 140 may have any shape without specific limitations as long as it can surround and protect the moved-down rotating body from a typhoon and the like wind of high speed. In this embodiment, the windbreak 140 is approximately shaped like a cylinder.

Figure 9A:
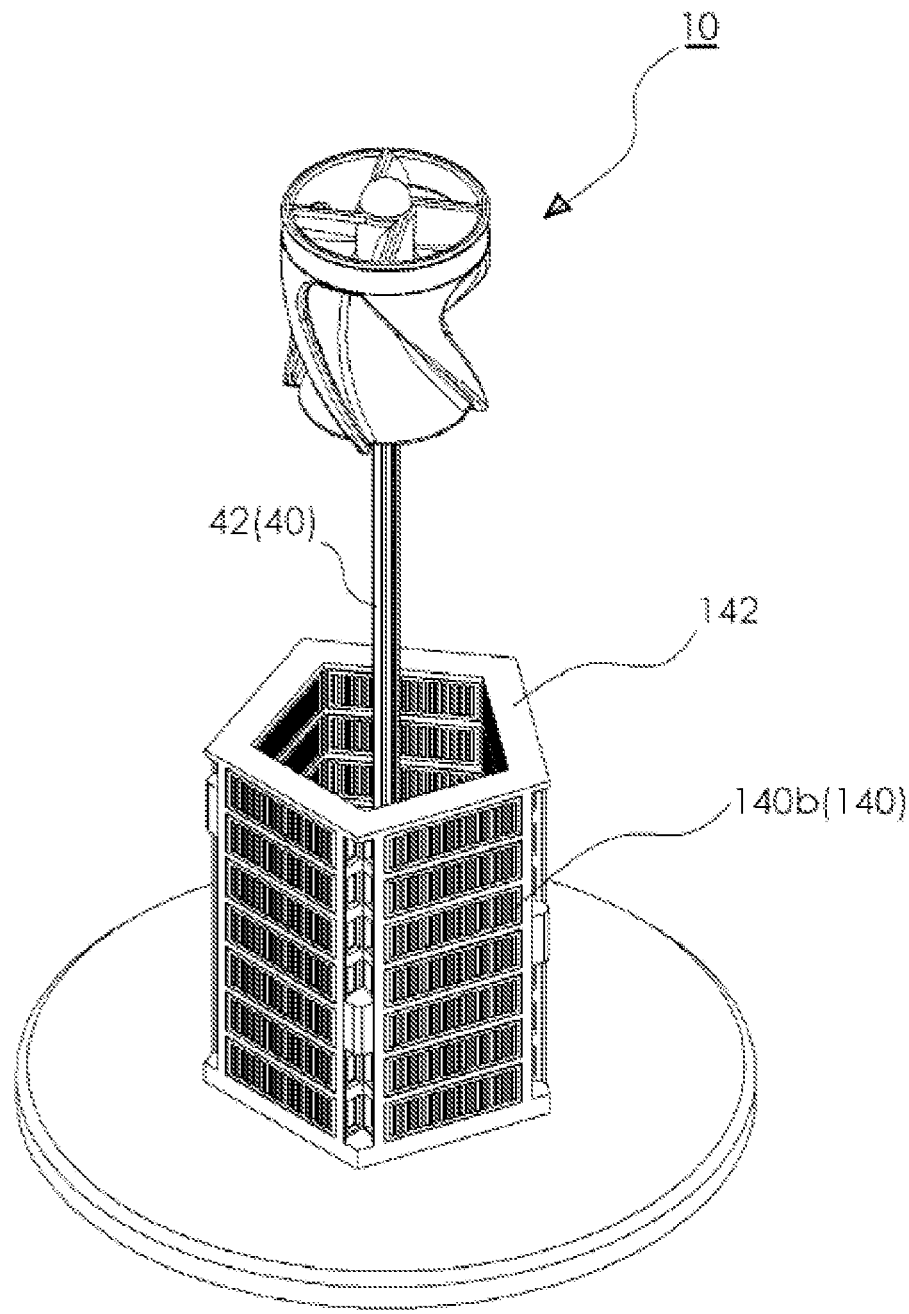
FIGS. 9A and 9B are perspective views for describing alternative examples of a power generation system with the fluid power generator according to the first embodiment of the disclosure.
Figure 9B:
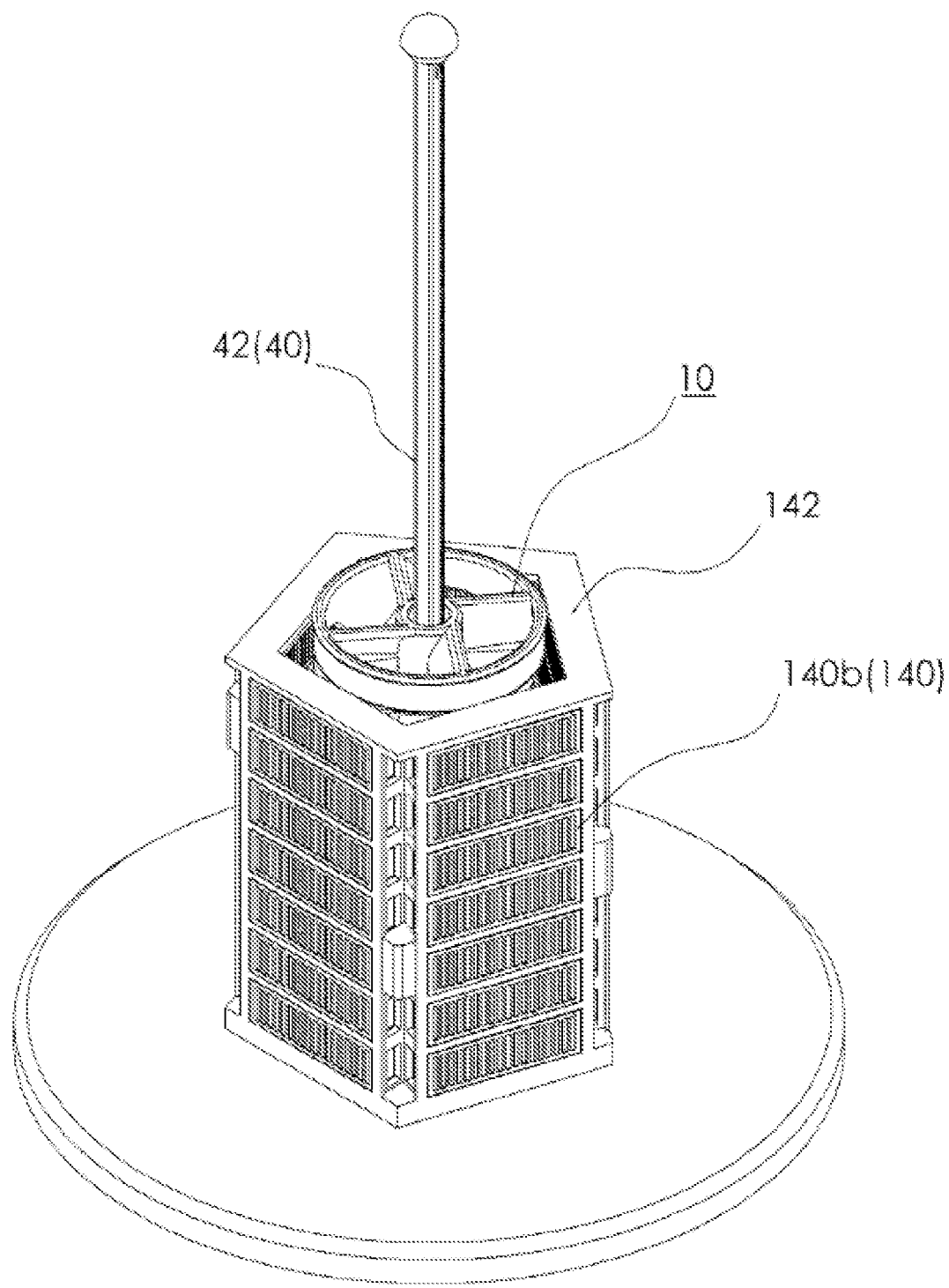

FIGS. 9A and 9B are perspective views for describing alternative examples of a power generation system with the fluid power generator according to the first embodiment of the disclosure, in which FIG. 9A shows that the rotating body portion of the fluid power generator is moved up, and FIG. 9B shows that the rotating body portion of the fluid power generator is moved down.

Referring to FIGS. 9A and 9B, the power generation system with the fluid power generator according to the first embodiment includes the fluid power generator 10 selected among the foregoing fluid power generators disclosed in the foregoing embodiments, an up-and-down movement actuator (not shown) applying an actuation force to the fluid power generator 10 to move up and down, and the windbreak 140 preventing a wind force from being applied to the spiral blade 30 in a moved-down state, in which the windbreak 140 includes a plant cultivation container 140b having a space for cultivating a plant.

A plurality of plant cultivation containers 140b is stacked in a container frame 142 and arranged to surround the fluid power generator.

Further, the plant cultivation container 140b refers to an apparatus for cultivating a plant, and is internally provided with an artificial light source such as an LED module, a planting tray in which the plant is planted, a nutrient-solution feeder for feeding a nutrient solution, etc.

As described above, the power generation system with the fluid power generator according to the first embodiment of the disclosure employs the up-and-down movement actuator to move up and down the rotating body portion of the fluid power generator as necessary, and thus moves the rotating body portion of the fluid power generator down into the windbreak 140 under an emergency situation such as a typhoon, thereby safely protecting the rotating body portion of the fluid power generator and thus achieving a stable power generation system.

Figure 10:
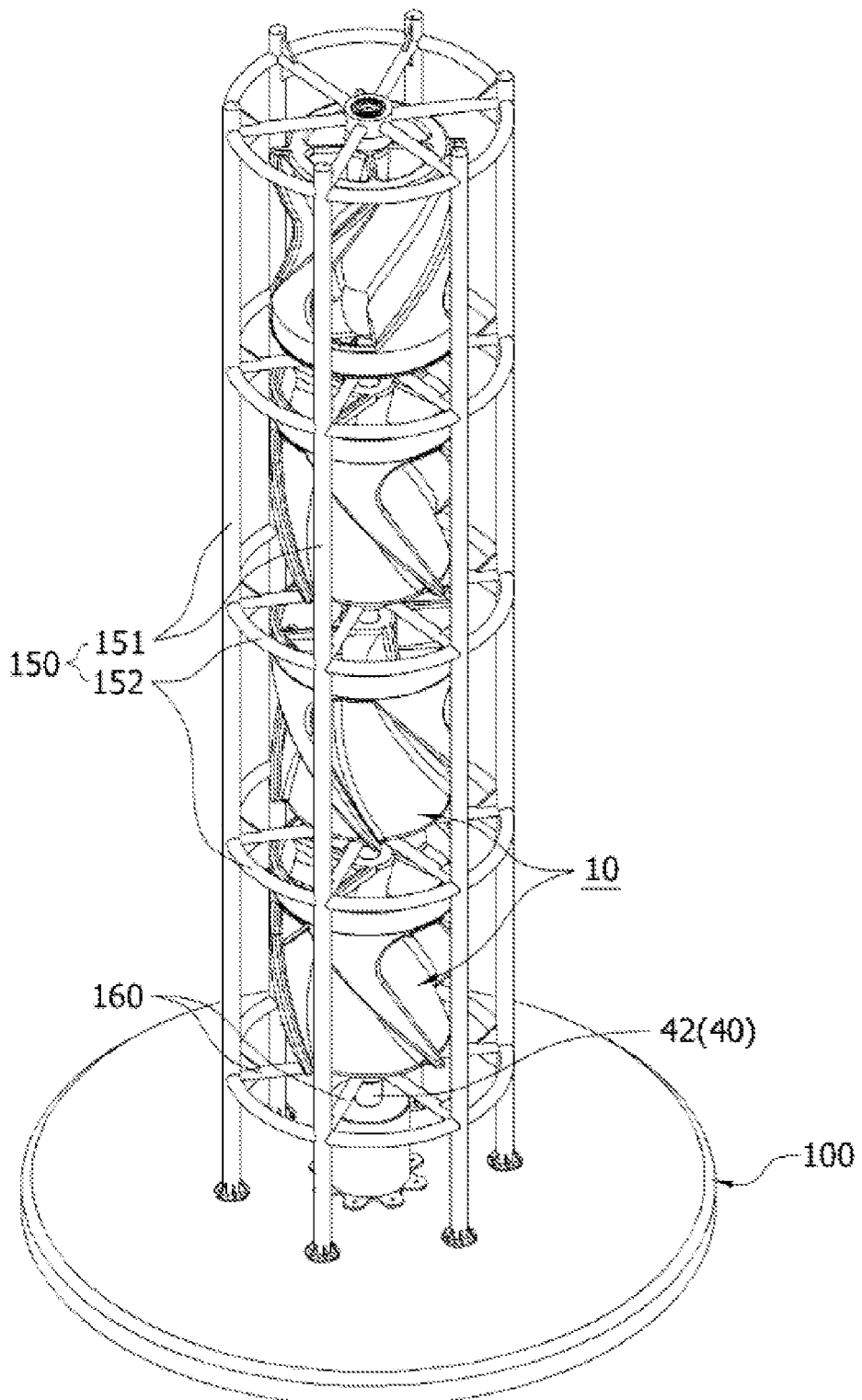
FIG. 10 is a perspective view for describing a power generation system with the fluid power generator according to the second embodiment of the disclosure.

FIG. 10 is a perspective view for describing a power generation system with the fluid power generator according to the second embodiment of the disclosure.

Referring to FIG. 10, the power generation system with the fluid power generator according to the second embodiment includes a plurality of fluid power generators 10 selected among the fluid power generators disclosed in the foregoing embodiments, which are put on a long rotary shaft 40 and arranged up and down at regular intervals.

The plurality of fluid power generators put on the long rotary shaft 40 through the insertion holes formed at the centers of the ascending air-current forming bodies 20, and includes a support frame 150 installed along up and down directions, i.e., an arranged direction of the fluid power generators, and a plurality of shaft supporting members 160 rotatably supporting the rotary shaft 40.

The support frame 150 includes a plurality of pillars 151 to be installed equiangularly, and a circular connecting member 152 connected between the pillars 151.

The shaft supporting member 160 has a first end coupled to the support frame 150, and a second end installed in the rotary shaft 40, and includes a bearing (not shown) at a portion to be connected to the rotary shaft 40, thereby rotatably supporting the rotary shaft 40.

As described above, the power generation system with the fluid power generator according to the second embodiment of the disclosure includes the fluid power generators 10 at multi levels along the up and down directions of the long rotary shaft 40, so that the rotating torques generated in the fluid power generators 10 can be transferred to the rotary shaft 40, thereby getting high-output electric energy from the generators.

Figure 11A:
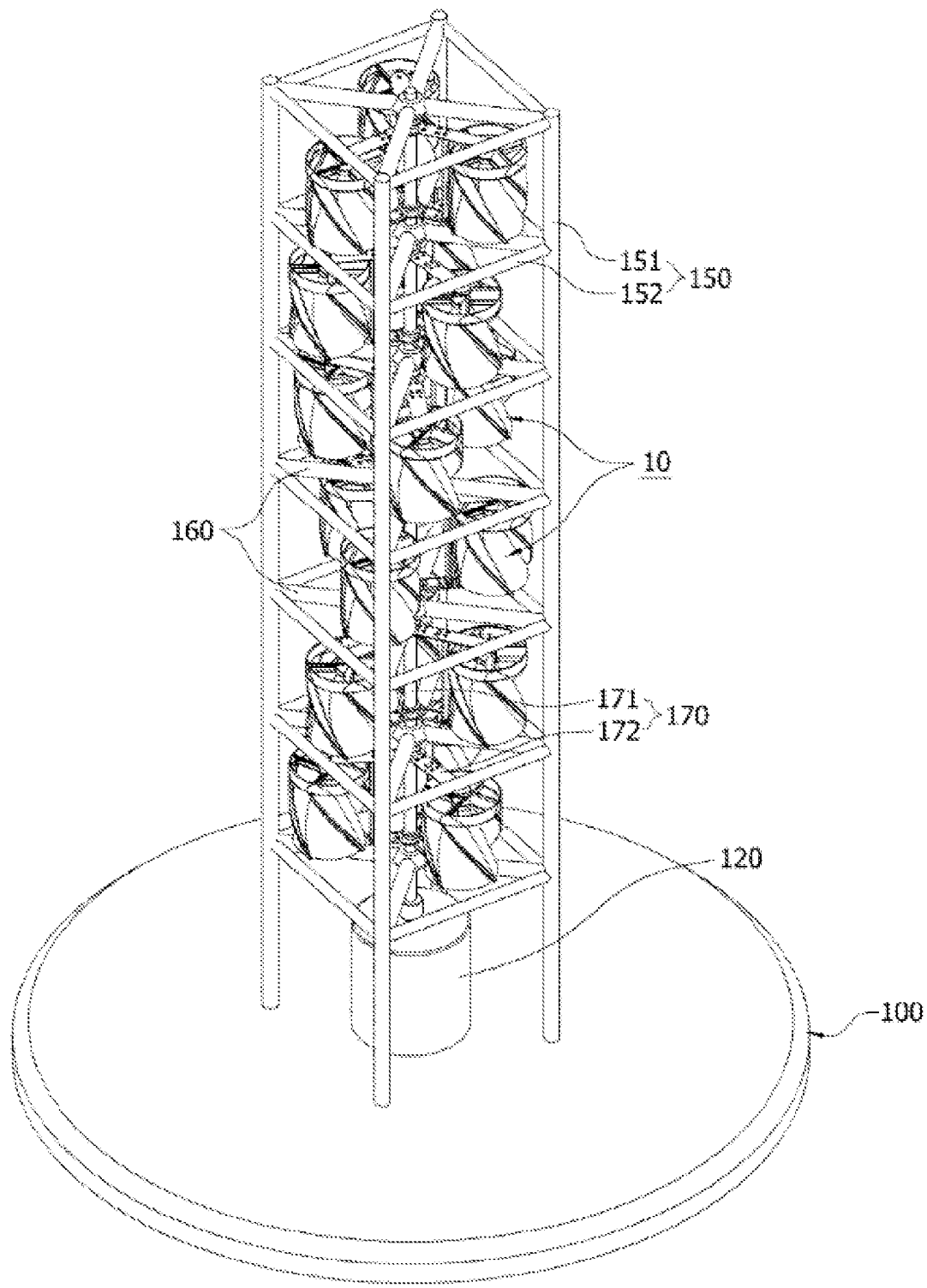
FIG. 11A is a perspective view of a power generation system with the fluid power generator according to the third embodiment of the disclosure.
Figure 11B:
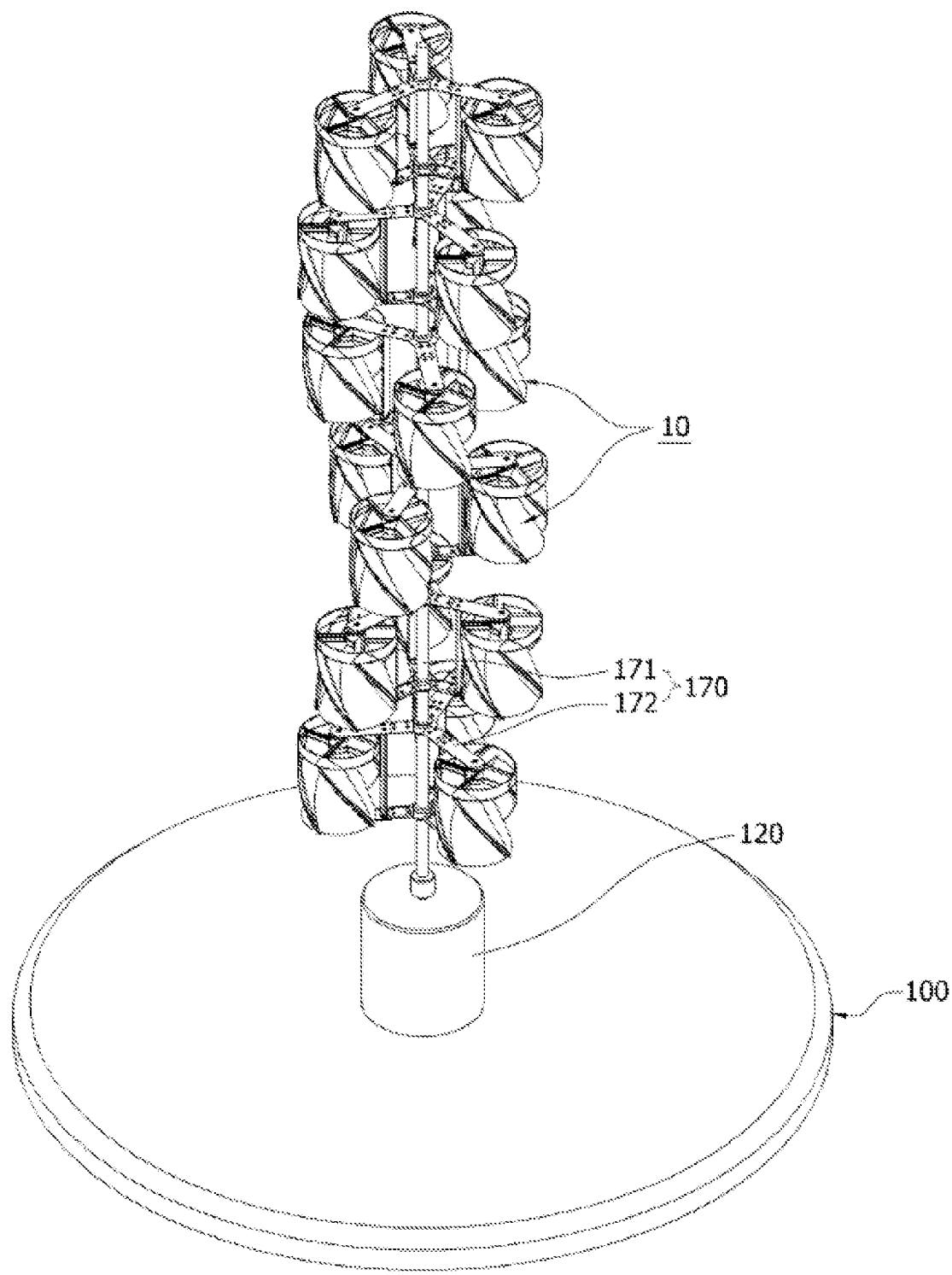
FIG. 11B is a perspective view showing a state that a support frame and a shaft supporting member are separated from the power generation system with the fluid power generator according to the third embodiment of the disclosure.
Figure 11C:
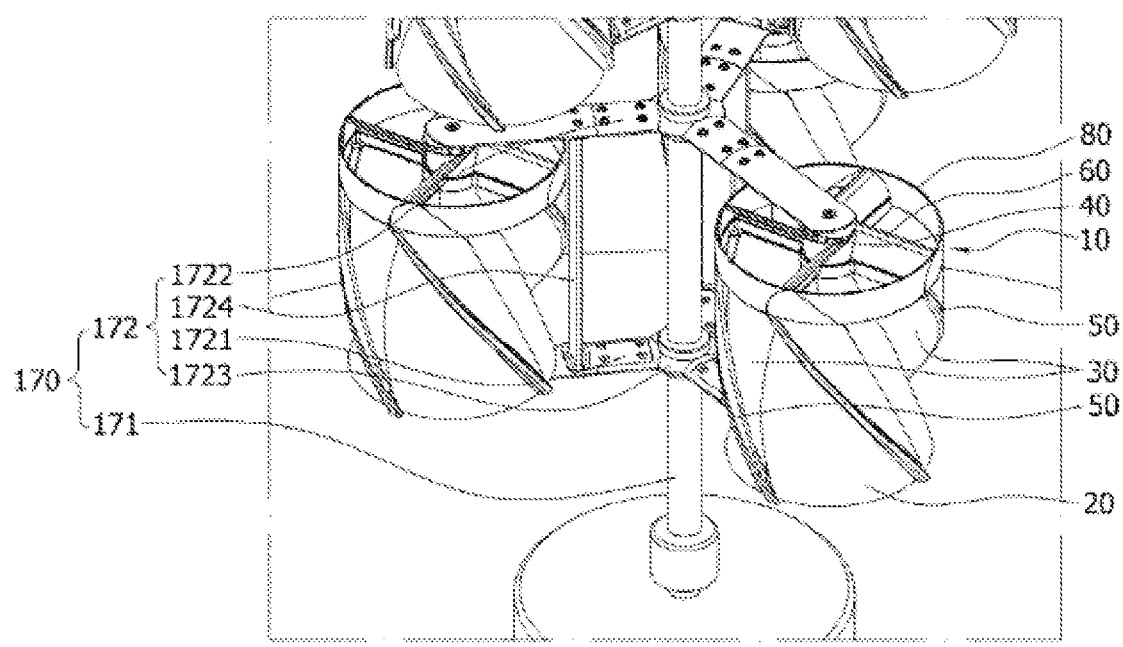
FIG. 11C is a partially enlarged perspective view of FIG. 11B.

FIG. 11A is a perspective view of a power generation system with the fluid power generator according to the third embodiment of the disclosure, FIG. 11B is a perspective view showing a state that a support frame and a shaft supporting member are separated from the power generation system with the fluid power generator according to the third embodiment of the disclosure, and FIG. 11C is a partially enlarged perspective view of FIG. 11B.

Referring to FIGS. 11A to 11C, the power generation system with the fluid power generator according to the third embodiment of the disclosure includes the fluid power generators 10 selected among the fluid power generators disclosed in the foregoing embodiments, which arranged up and down at regular intervals as a plurality of layers, and includes a rotary frame 170 in which a plurality of fluid power generators are rotatably installed in each layer.

The rotary frame 170 includes a main rotary shaft 171 connected to the generator, and a plurality of rotary supporting member 172 having a first end rotatably connected to the main rotary shaft 171 and a second end rotatably connected to the rotary shaft 40.

The main rotary shaft 171 is provided as a member shaped like a long bar, and includes a lower portion connected to the generator 120.

The rotary supporting members 172 are arranged to form a plurality of layers along the up and down directions of the main rotary shaft 171, and function to arrange the plurality of fluid power generators 10 in a multi-layered structure.

The rotary supporting member 172 includes a lower rotary supporting member 1721 having a first end connected to the main rotary shaft 171 and a second end connected to a lower end of the rotary shaft 40 of the fluid power generator, and an upper rotary supporting member 1722 having a first end connected to the main rotary shaft 171 and a second end connected to an upper end of the rotary shaft 40.

Further, the lower rotary supporting member 1721 and the upper rotary supporting member 1722 are connected to a fastening ring 1723 installed on the main rotary shaft 171 in order to transfer the rotating forces to the main rotary shaft 171, are connected each other by the up and down connecting member 1724.

The power generation system with the fluid power generator according to the third embodiment of the disclosure, as shown in FIG. 11A, includes the support frame 150 installed along the up and down directions, i.e., the arranged direction of the fluid power generator so as to support the fluid power generator, and a plurality of shaft supporting members 160 to rotatably support the main rotary shaft 171.

The support frame 150 and shaft supporting member 160 are a little different in shape from each other but similar to those of the foregoing second embodiment, and thus detailed descriptions thereof will be omitted.

As described above, the power generation system with the fluid power generator according to the third embodiment of the disclosure includes a plurality of rotary member supports 172 put on the long main rotary shaft 171 and arranged at regular intervals, and the fluid power generator 10 is installed in each rotary member support 172, thereby achieving the power generation system in which the plurality of fluid power generators are arranged in a multi layered structure.

In the power generation system, the rotating torque of the rotary shaft 40 based on the drag of the spiral blade 30, the first auxiliary drag blade 50 and the second auxiliary drag blade 60 of the fluid power generator 10 arranged in each layer is transferred by means of the rotary member support 172, thereby rotating the main rotary shaft 171. In this manner, the main rotary shaft 171 spins by the rotating force generated in three fluid power generators 10 arranged in each layer, and therefore the generator 120 can obtain high-output electric energy.

The foregoing description is merely one embodiment for carrying out a fluid power generator according to the disclosure, and the disclosure is not limited to the foregoing embodiment. Thus, it will be appreciated by any person having an ordinary skill in the art that the technical idea of the disclosure falls within the extent to which various changes can be made without departing from the scope of the disclosure.

The terminology used herein is for the purpose of describing particular embodiments only and is not intended to limit the disclosure. Singular expressions include plural expressions unless the context clearly indicates otherwise. In this application, the terms "comprise" or "have" are intended to indicate that there is a feature, number, step, action, component, part, or combination thereof described in the specification, and one or more other features. It is to be understood that the disclosure does not exclude the possibility of the presence or the addition of numbers, steps, operations, components, components, or a combination thereof.

INDUSTRIAL APPLICABILITY

According to the disclosure, there are provided a fluid power generator capable of efficiently producing electricity even in a weak wind, and a power generation system including the same, in which drag of wind is efficiently used to improve efficiency of power generation without increasing the size of a blade to thereby widen a range of use, and a sign is formed on an upper exposure surface exposed to the outside, thereby achieving a fluid power generator for advertisement to have an advertisement effect using electricity produced in itself.

DESCRIPTION OF REFERENCE NUMBERS

10: fluid power generator,
20: ascending air-current forming body,
30: spiral blade,
40: rotary shaft,
50: first auxiliary drag blade,
60: second auxiliary drag blade,
70: upper-end cap,
80: wind-guiding reinforcing blade,
100: supporting plate,
110: pillar pipe,
120: generator,
140: windbreak,
150: support frame,
160: shaft supporting member,
170: rotary frame,
180: up-and-down movement actuator

The invention claimed is:

1. A fluid power generator comprising:
an ascending air-current forming body installed on a rotary shaft;
a plurality of spiral blades spirally arranged along an outer circumferential surface of the ascending air-current forming body;
a generator configured to produce electricity by rotation of the ascending air-current forming body;
a first auxiliary drag blade integrally connected to each spiral blade to be inclined against a surface of the respective spiral blade along an edge of the respective spiral blade to trap wind; and
a second auxiliary drag blade disposed at an upper end portion of each spiral blade,
wherein the ascending air-current forming body has a lower outer diameter larger than an upper outer diameter,
wherein each spiral blade has a horizontal width gradually increasing upward from a bottom thereof.

2. The fluid power generator of claim 1, wherein each first auxiliary drag blade has a horizontal width gradually increasing upward from a bottom thereof.

3. The fluid power generator of claim 1, wherein each second auxiliary drag blade is formed as curved in a direction of receiving drag of ascending air-current.

4. The fluid power generator of claim 1, further comprising a wind-guiding reinforcing blade connected to each second auxiliary drag blade disposed at the upper end portion of the respective spiral blade.

5. The fluid power generator of claim 4, wherein each wind-guiding reinforcing blade comprises an upper exposure surface connected to an edge of the respective second auxiliary drag blade to provide a wind outlet between each wind-guiding reinforcing blade and the respective second auxiliary drag blade.

6. The fluid power generator of claim 1, wherein at least one of the ascending air-current forming body and the spiral blades has a hollow interior.

7. The fluid power generator of claim 1, wherein at least one of the air-current forming body and the spiral blades has an interior filled with a solid component.

8. A power generation system comprising:
a fluid power generator;
a motor the fluid power generator up and down,
wherein the fluid power generator comprises:
an ascending air-current forming body installed on a rotary shaft;
a plurality of spiral blades spirally arranged along an outer circumferential surface of the ascending air-current forming body; and
a generator configured to produce electricity by rotation of the ascending air-current forming body,
wherein the rotary shaft comprises a long up-and-down movement rod disposed to cross a center of the ascending air-current forming body to function as a moving rail for the fluid power generator.

9. The power generation system of claim 8, comprising a windbreak configured to surround the spiral blades and prevent a wind force from being applied to the spiral blades in a state that the fluid power generator is moved down.

10. The power generation system of claim 9, wherein the windbreak comprises a plant cultivation container having a space for cultivating a plant.

* * * * *